E. WEIST.
DETACHABLE TEETH FOR GEAR WHEELS.
APPLICATION FILED FEB. 6, 1913.

1,081,996.

Patented Dec. 23, 1913.

Inventor
E. Weist

Witnesses
Robert M. Sutphen
A. I. Hud.

By Watson E. Coleman
Attorney

UNITED STATES PATENT OFFICE.

EDWARD WEIST, OF LUDDEN, NORTH DAKOTA.

DETACHABLE TEETH FOR GEAR-WHEELS.

1,081,996.  Specification of Letters Patent.  Patented Dec. 23, 1913.

Application filed February 6, 1913. Serial No. 746,656.

*To all whom it may concern:*

Be it known that I, EDWARD WEIST, a citizen of the United States, residing at Ludden, in the county of Dickey and State of North Dakota, have invented certain new and useful Improvements in Detachable Teeth for Gear-Wheels and the like, of which the following is a specification, reference being had to the accompanying drawings.

This invention relates to improvements in teeth for gear wheels or the like, and more particularly to that class of teeth which are detachable.

An object of this invention is the provision of a tooth which is slidably engaged in a groove in the rim of a gear wheel and means for detachably securing the tooth in position in the gear wheel.

Another object of this invention is the provision of a tooth which is slidably disposed in a transverse groove in the rim of a gear wheel, the groove being closed at one end, and a set screw being passed through the wall of the groove into a threaded opening in the end of the tooth, whereby the tooth is maintained in position in the gear wheel.

With these and other objects in view, my invention consists in the novel constructions which will be hereinafter more fully described, claimed and illustrated in the accompanying drawing, in which—

Figure 1:
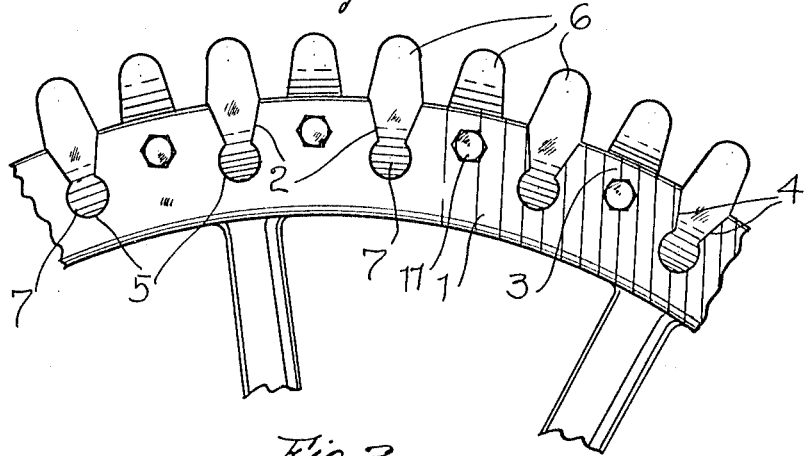
Figure 2:
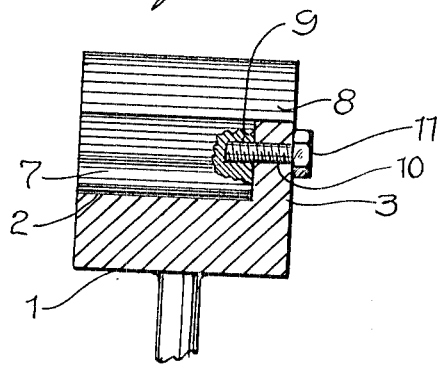
Figure 3:
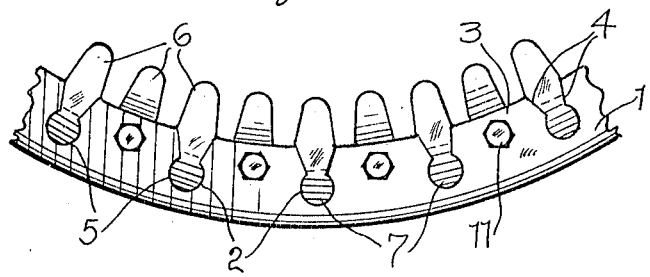

Figure 1 is a side elevation of a rim of a wheel showing several of my improved teeth attached thereto; Fig. 2 is a transverse section of the rim with a tooth partly in section; and Fig. 3 is a side elevation of a rim showing a plurality of the teeth applied to the inner face thereof.

Referring more particularly to the drawing, the numeral 1 designates the rim of a gear wheel, which is provided in its periphery with a plurality of transversely extending grooves 2, which are closed at one end by end walls 3. The end walls are preferably arranged alternately on the opposite sides of the rim, and the side walls of each groove converge as at 4, the bottom wall of the groove being curved as at 5 to form a pocket. Each of the teeth 6 is tapered from its center toward its opposite longitudinal edges, the inner longitudinal edge of each tooth being enlarged and rounded as at 7 to engage in the pocket 5 formed by the rounded inner wall of the groove. The upper portion of each tooth is formed with an extension 8 which is adapted to overlap the end wall 3 of the groove so that the tooth will extend entirely across the face of the rim. Formed in one end of the tooth in the medial portion thereof, is a threaded recess 9 which registers with an opening 10 in the end wall 3 of the groove, and a set screw 11 is passed through the opening 10 and threadably connected in the recess 9 to securely maintain the tooth 6 in position in the rim.

It will be seen that when the teeth become worn out or broken, they may be easily removed from the gear wheel by removing the set screws 11 from the recesses 9, so that new teeth may be secured to the wheel. In a gear wheel of the usual construction, the entire wheel becomes useless when any of the teeth become broken or worn out and it will be readily understood that a gear wheel constructed in accordance with my invention may be maintained with small operating expense. While I have illustrated the teeth connected to a gear wheel, it will be understood that they may be applied to rack bars, or other similar devices, in which teeth of a similar character are required.

What I claim is:—

1. The combination with a wheel having a plurality of transversely extending grooves in the rim thereof, of teeth slidably disposed in said grooves, each of said grooves being provided with an end wall, the end walls being arranged alternately on opposite sides of said rim, and means disposed through said end walls into engagement with said teeth, as and for the purpose described.

2. The combination in a gear wheel, of a rim provided with a plurality of transverse grooves and with an end wall at one end of each groove, the end walls being arranged alternately on opposite sides of the rim, a tooth seated in each said groove, and means for securing the teeth in the grooves.

In testimony whereof I hereunto affix my signature in the presence of two witnesses.

EDWARD WEIST.

Witnesses:
J. A. McKEE,
C. H. SLONE.

Copies of this patent may be obtained for five cents each, by addressing the "Commissioner of Patents, Washington, D. C."